United States Patent Office 3,551,106
Patented Dec. 29, 1970

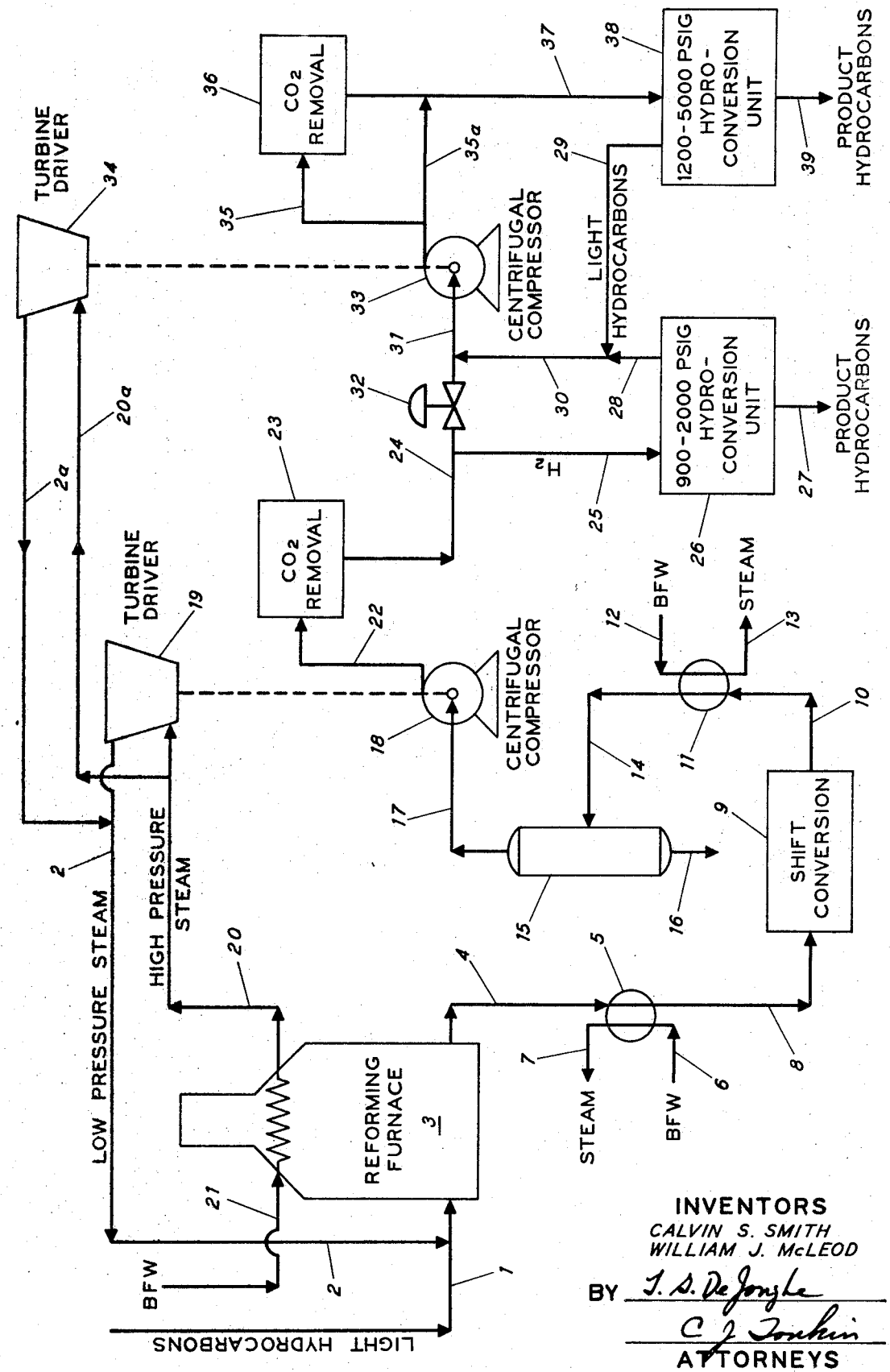

3,551,106
CENTRIFUGAL COMPRESSION OF HYDROGEN TO TWO PRESSURE LEVELS
Calvin S. Smith and William J. McLeod, El Cerrito, Calif., assignors to Chevron Research Company, San Francisco, Calif., a corporation of Delaware
Continuation-in-part of application Ser. No. 736,520, May 17, 1968, which is a continuation-in-part of application Ser. No. 665,106, Sept. 1, 1967. This application Dec. 31, 1968, Ser. No. 788,299
Int. Cl. C01b 1/02; C10g 13/00
U.S. Cl. 23—210                                    8 Claims

ABSTRACT OF THE DISCLOSURE

A process for producing high pressure hydrogen at two pressure levels which comprises:

(a) generating a hydrogen-rich gas stream containing $CO_2$;
(b) centrifugally compressing the hydrogen-rich gas to a pressure between about 900 and 2,000 p.s.i.g.;
(c) removing $CO_2$ from the compressed hydrogen-rich gas to obtain a $CO_2$-lean, hydrogen-rich gas;
(d) injecting a light hydrocarbon into the $CO_2$-lean, hydrogen-rich gas subsequent to $CO_2$ removal to raise the molecular weight of the $CO_2$-lean, hydrogen-rich; and
(e) centrifugally compressing the hydrogen-rich gas obtained in step (d) to a pressure between about 1,200 and 5,000 p.s.i.g. and at least about 300 p.s.i. higher than the pressure obtained in accordance with step (b).

CROSS-REFERENCES

This application is a continuation-in-part of Ser. No. 736,520, filed May 17, 1968, which in turn is a continuation-in-part of Ser. No. 665,106, filed Sept. 1, 1967.

BACKGROUND OF THE INVENTION (1) Field of the invention

This invention relates to processes for the production, compression, and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

(2) Description of the prior art (A) Means for obtaining raw, hydrogen-rich gas.— There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

$$C_nH_{2n+2} + nH_2O \rightleftharpoons nCO + (2n+1)H_2$$
$$C_nH_{2n+2} + 2nH_2O \rightleftharpoons nCO_2 + (3n+1)H_2$$

e.g., methane-steam:

$$CH_4 + H_2O \rightleftharpoons CO + 3H_2$$

and $$CH_4 + 2H_2O \rightleftharpoons CO_2 + 4H_2$$

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons; for example, with methane, the reaction is:

$$CH_4 + \tfrac{1}{2}O_2 \rightleftharpoons H_2 + CO$$

With heavier hydrocarbons, the reaction may be represented as follows:

$$C_7H_{12} + 2.8O_2 + 2.1H_2O \rightleftharpoons 6.3CO + .7CO_2 + 8.1H_2$$

Both catalytic and noncatalytic partial oxidation processes are in use. Suitable operating conditions include temperatures from 2,000° F. up to about 3,200° F., and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

$$CO + H_2O \rightleftharpoons H_2 + CO_2$$

This reaction is typically effected by passing the CO and $H_2O$ over a catalyst such as iron oxide activated with chromium. The reaction kinetics are faster at higher temperature, but the equilibrium to hydrogen is favored by lower temperatures. Therefore, it is not uncommon to have a high temperature shift stage followed by a low temperature shift stage. Pressure has little bearing on the equilibrium in the water-gas shift reaction.

(B) $CO_2$ or $CO_2 + H_2S$ removal.—Because most hydrogen using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed.

In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing $135 \times 10^6$ standard cubic feet per day of hydrogen, over $300 \times 10^6$ B.t.u.'s per hour are generally required to reboil the MEA in order to effect the regeneration of the MEA. These $300 \times 10^6$ B.t.u.'s per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems—for example, hot carbonate—are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slipstream of the absorbent from the bottom of the stripper. Only that portion of the slipstream that is vaporized is returned to the stripper system. Heavy tarry material collects in the bottom of the reclaimer and is periodically withdrawn and passed to sewage as a spent alkanolamine stream. Common practice is to clean the reclaimer as frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, the cleaning procedure is necessary to avoid build-up of corrosive bodies in the $CO_2$ absorption system. Corrosion, which would be worse without the reclaimer, still is a considerable problem in the alkanolamine $CO_2$ absorption systems.

(C) Compression of high purity hydrogen.—Some of the processes which use high purity hydrogen as a reactant are: hydrodesulfurization, operating at pressures between about 100 and 1,500 p.s.i.g.; hydrotreating, operating at pressures between about 200 and 2,000 p.s.i.g.; hydrocracking, operating at pressures between about 450 and 3,000 p.s.i.g.; and thermal hydrodealkylation, operating at pressures between about 450 and 1,000 p.s.i.g. All of these just-mentioned hydroconversion processes may operate at even higher pressures (for example, up to 10,000 p.s.i.g.) than just given but seldom will operate at pressures lower than the range given. Thus it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by "centrifugal" force exerted on an entrapped gas during rotation of an impeller at high speed. (The term centrifugal force is used loosely here, as centripetal force is perhaps more technically accurate.) Most centrifugal compressors depend primarily on "centrifugal" force and high tangential velocity of the fluid in the periphery of the impeller (or rotors or blades in the instance of some turbocompressors) to produce the desired head or discharge pressure. In this specification, the terms "centrifugal compression" or "compressor" are meant to include turbine compression or turbocompressors, including, for example axial-flow compressors. In the broad sense of centrifugal compression used herein, compression is generally effected, at least to a substantial degree, by conversion of velocity head to pressure head.

The reciprocating compressor is used for hydrogen compression, but it has some severe disadvantages, particularly for large-size plants:

(1) All parts are subject to unbalanced, reciprocating stresses; and foundations, frames and other parts must be large. To minimize vibration, speeds are low (400–700 r.p.m.); and capacity is low. Therefore, in large plants, several machines are required. Cost of installing, instrumenting, protecting and piping several machines is high. Considerable land is required, and plants are bigger and more complex, making them more difficult to control.

(2) The reciprocating machine is less reliable than centrifugal machines, and it is common practice to design plants with one or two expensive spare machines ready to come on-stream in the event of a failure.

(3) The reciprocating machine produces a pulsating gas supply which sonically transmits vibration to piping instruments and other plant facilities. Such vibrations can cause hazardous failures with hydrogen at high pressure.

(4) The low speed of reciprocating compressors tends to limit prime movers to low speed, electric motors or gas engines. While it is possible to use high speed steam or gas turbines, large reduction gears must be used. The pounding of the reciprocating loads has led to poor experience with these units. Hydrocracking and hydrogen manufacturing processes can be designed to produce byproduct steam if it could be used in steam turbine drivers. However, for the reasons just given, this byproduct steam is generally not used to drive the reciprocating compressors.

(5) Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| Barometer, p.s.i.a. | 14.4 | 14.4 | 14.4 |
|---|---|---|---|
| Inlet temperature, °F | 60.0 | 60.0 | 110.0 |
| k. (Cp/Cv for inlet gas) | 1.11 | 1,398 | 1.36 |
| Inlet capacity, c.f.m | 20,000.0 | 20,000.0 | 20,000.0 |
| Head, ft.-lb. per lb | 22,000.0 | 22,000.0 | 22,000.0 |
| Molecular weight | 63.0 | 28.95 | 10.1 |
| Inlet pressure, p.s.i.a | 16.73 | 14.73 | 14.08 |
| Discharge pressure, p.s.i.a | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 p.s.i.g. starting from a pressure of 200 p.s.i.g. On the other hand, two stages of a reciprocating positive displacement compressor could increase the pressure from 200 p.s.i.g. to 1,700 p.s.i.g. Thus, in spite of their problems previously discussed, reciprocating compressors have heretofore been used in bringing high purity hydrogen to high pressure.

SUMMARY OF THE INVENTION

According to the present invention a process is provided for producing high pressure hydrogen at two pressure levels which comprises:

(a) Generating a hydrogen-rich gas stream containing $CO_2$;

(b) Centrifugally compressing the hydrogen-rich gas to a pressure between about 900 and 2,000 p.s.i.g.;

(c) Removing $CO_2$ from the compressed hydrogen-rich gas to obtain a $CO_2$-lean, hydrogen-rich gas;

(d) Injecting a light hydrocarbon into the $CO_2$-lean, hydrogen-rich gas subsequent to $CO_2$ removal to raise the molecular weight of the $CO_2$-lean, hydrogen-rich gas; and (e) Centrifugally compressing the hydrogen-rich gas obtained in step (d) to a pressure between about 1,200 and 5,000 p.s.i.g. and at least about 300 p.s.i. higher than the pressure obtained in accordance with step (b).

U.S. Pat. 3,401,111 discloses a process for obtaining high pressure hydrogen via centrifugal compression wherein butane or its molecular equivalent in the 30 to 80 molecular weight range is introduced into a hydrogen stream in advance of centrifugal compression. The added hydrocarbon results in the molecular weight of the hydrogen gas stream being sufficiently high so that centrifugal compression becomes feasible. The addition of a hydrocarbon such as butane is preferred because the added butane may be condensed out of the high pressure effluent from a hydrocracker or hydrotreater so that the butane does not tend to accumulate in the high pressure recycle hydrogen gas to the hydrocracker or hydrotreater. The disclosure of U.S. Pat. 3,401,111, particularly that portion of U.S. Pat. 3,401,111 relating to centrifugal compression of hydrogen-rich gas containing an added hydrocarbon, is incorporated by reference into the present application.

It should be noted that the principle of adding a hydrocarbon, such as propane or butane, to a hydrogen-rich gas stream so that a centrifugal compressor will work better has been utilized for some time in fluid catalytic cracking and in reforming.

In fluid catalytic cracking the effluent from the catalytic cracker is typically sent to a distillation column called "the synthetic crude column." The overhead of the synthetic crude column is condensed resulting in a liquid gasoline stream, part of which is refluxed and part of which is withdrawn as product gasoline. The uncondensed portion of the overhead is withdrawn as a gaseous stream at about 10 p.s.i.g. from the synthetic crude column reflux drum. This gas stream is compressed by one or two centrifugal compression stages to a pressure of about 150 to 250 p.s.i.g. Typically the gas stream contains only about 5 to 20 volume percent hydrogen along with $C_1$ up to about $C_5$ hydrocarbons so that molecular weight (and thus density) of the gas stream is sufficiently high so that the compressors operate satisfactorily. However, in some instances, for example, when the catalytic cracking catalyst is fouled with metals, the hydrogen in the gas stream increases with the result that the gas stream density decreases and the centrifugal compressor is then not able to obtain the desired pressure at a permissible speed (r.p.m.'s). In some instances propane or butane or other light hydrocarbons are injected into the overhead gas stream to be centrifugally compressed so that the density of the overhead gas stream is sufficiently high so that the centrifugal compressor may obtain the necessary pressure at permissible speeds.

Somewhat similar to the above type of experience is the practice carried out in many reforming plants. In the typical reforming plant hydrocarbons are fed together with hydrogen to a reforming reactor operating at a pressure between about 200 and 1,000 p.s.i.g. The effluent from the reformer passes to a high pressure separator wherein hydrogen recycle gas is separated from the bulk of the reformer effluent hydrocarbons. This hydrogen-rich gas stream is recycled to the reformer by means of a centrifugal compressor. Typically the recycle hydrogen is about 75 to 85 percent hydrogen. However, on occasion the hydrogen content may go up to 95 percent or more. When this happens the centrifugal compressor is not able to handle a sufficiently great amount of recycle hydrogen-rich gas at a sufficient pressure increase across the compressor, while still remaining within permissible compressor speed limitations. To overcome this problem the temperature in the high pressure separator is raised a small amount in order to increase the light hydrocarbons in the recycle gas slightly so that the centrifugal compressor receives a gas of sufficient density to operate properly.

Thus, it can be seen that certain aspects of the present invention are somewhat similar to operations employed in some fluid catalytic cracking plants and in some reforming plants in the past. The present invention to a large extent integrates previously known principles and practices into a new overall process.

In accordance with the present invention wherein high pressure hydrogen is produced at two pressure levels, it is preferred that the hydrogen-rich gas produced at the first pressure level is used in a hydroconversion process, such as hydrofining or hydrocracking, operating at a pressure between about 900 and 2,000 p.s.i.g. and that the hydrogen-rich gas produced at the second pressure level is used in a hydroconversion process operating at a higher pressure between about 1,200 and 5,000 p.s.i.g. Preferably the two hydroconversion units are part of a single refinery.

In a preferred embodiment of the present invention, at least 90 percent of the $CO_2$ in the hydrogen-rich gas is removed after centrifugal compression to the first pressure level. Preferably the $CO_2$ is removed by absorption into a physical absorbent. To aid in the removal of $CO_2$ using a physical absorbent, hydrogen and $CO_2$ may be compressed to a high pressure as, for example, up to about 3,000 p.s.i.g. The surprising advantages obtained by centrifugally compressing a hydrogen-rich gas stream prior to complete $CO_2$ removal are discussed in our application Ser. No. 736,520, which is incorporated by reference into the present specification.

Removing 90 percent or more of the $CO_2$ will in many instances result in the hydrogen-rich gas stream being too low in average molecular weight for feasible centrifugal compression of the hydrogen-rich gas to the second pressure level. This is particularly true when less than about 2 to 5 percent $CO_2$ remains in the hydrogen-rich gas stream after $CO_2$ removal. In most instances when at least 90 percent of the $CO_2$ is removed from the hydrogen-rich gas at the first pressure level, there will be less than about 2 to 5 percent $CO_2$ remaining in the hydrogen-rich gas, particularly when the hydrogen-rich gas is generated by steam reforming. It is generally desirable to reduce the $CO_2$ to low levels after attaining the first pressure level because then only a small amount of $CO_2$ scrubbing or the equivalent will be required to put the hydrogen in the purified form usually desired for hydrocracking or other hydroprocessing.

When 90 percent or more of the $CO_2$ is removed from the high pressure hydrogen-rich gas at the first pressure level, it is preferred to inject a light hydrocarbon into the $CO_2$-lean, hydrogen-rich gas and then centrifugally compress the hydrogen-rich gas to a pressure between about 1,200 and 4,000 p.s.i.g. with the second pressure level thus attained being at least 300 p.s.i. greater than the first pressure level.

Various light hydrocarbon streams may be used to raise the average molecular weight of the hydrogen-rich gas, such as light hydrocarbon gas streams comprised of ethane, propane, butane and some pentanes. Preferably the light hydrocarbon stream is obtained from the distillation section, frequently called the gas recovery section, of either a first pressure level hydroconversion unit or a second pressure level hydroconversion unit. In some instances a light hydrocarbon gas stream containing less than about 50 percent hydrogen is available from the second pressure level hydroconversion unit at a pressure sufficiently high so that it can be injected into the feed gas to the centrifugal compressor used to reach the second pressure level without the use of an injection compressor or with the use of only a minimum amount of injection compressor. For example, if the second pressure level hydroconversion unit operates at about 4,000 pounds and the reactor effluent is passed first to a separator operating at about 4,000 pounds to separate recycle hydrogen from the bulk of the reactor effluent and then the bulk of the reactor effluent is passed to a second separator operating at about 900 to 2,000 p.s.i.g., the off-gases from this second separator provide a particularly preferred light hydrocarbon stream to be injected into the hydrogen-rich gas prior to centifugal compression to the second pressure level.

The amount of light hydrocarbons injected should be sufficient to raise the molecular weight of the $CO_2$-lean, hydrogen-rich gas to at least about 4 and preferably at least 6. In many instances the centrifugal compression becomes more feasible if the average molecular weight is raised to above 8 or even 10.

Preferably the injected light hydrocarbon stream is primarily butane. By "primarily butane" is meant a hydrocarbon stream having more butanes than any other single hydrocarbon. Butanes are particularly preferred because as pointed out above the butanes are readily condensed from the hydrogen-rich gas after passing through the hydroconversion reactor and thus prevented from building up in the recycle hydrogen-rich gas within the hydroconversion unit.

In the present invention it is preferable to generate the hydrogen-rich gas containing $CO_2$ by steam-hydrocarbon reforming. When the hydrogen-rich gas is generated by reforming, it is advantageous to drive at least one of the centrifugal compressors by a steam turbine and to use the exhaust steam from the steam turbine to provide process steam for reaction with hydrocarbons in the steam-hydrocarbon reformer. Use of the steam in this manner is more fully described in our application Ser. No. 788,262, entitled "Hydrogen Manufacture With Integrated Steam Usage," filed Dec. 31, 1968, which application, particularly that portion of Ser. No. 788,262 relating to centrifugal compression of hydrogen using a steam turbine driver for the centrifugal compressor, is incorporated by reference into the present application.

Other drivers for the centrifugal compressors which would produce large economic savings compared to conventional practice can be integrated into the steam-hydrocarbon hydrogen process supplying hydrogen to a hydroconversion unit or zone and may include the following:

(1) As taught in our application Ser. No. 665,106, low pressure steam is generated in large quantities from the steam-methane process when $CO_2$ is removed by physical solvents at pressures in excess of 900 p.s.i.g. This steam, preferably superheated, can drive a condensing steam turbine which in turn drives the centrifugal compressor.

(2) As taught in our application Ser. No. 665,106, the hydroconversion zone is exothermic and generates large quantities of low pressure steam which can be used as in (1) above.

(3) A gas turbine can be used to drive the centrifugal compressor. The hot gases containing substantial oxygen from the gas turbine can be used as heat for the reformer, thus getting double duty from these gases.

(4) Combinations of (1), (2) or (3) plus double use of the steam generated in the reformer; once for driving a steam turbine, and once in the process.

The key to the success of any of these cost saving schemes is centrifugal compression of hydrogen with a heavy gas left in, such as $CO_2$ or CO or a heavy gas added such as a hydrocarbon gas. This produces surprising savings as substantial horsepower is required to compress the extra gas.

According to a preferred embodiment of the present invention the hydrogen-rich gas is produced at two pressure levels advantageously by leaving sufficient $CO_2$ in the hydrogen-rich gas after the first level of pressure is attained by centrifugal compression so that the molecular weight of the hydrogen-rich gas at the first pressure level is sufficient so that centrifugal compression may be feasibly employed to bring the hydrogen to the second pressure level. Thus, according to a preferred embodiment of the present invention, a process is provided for producing high pressure hydrogen at two pressure levels which comprises:

(a) Generating a hydrogen-rich gas stream containing $CO_2$;

(b) Centrifugally compressing the hydrogen-rich gas to a pressure between about 900 and 2,000 p.s.i.g.;

(c) Removing $CO_2$ from the compressed hydrogen-rich gas but leaving sufficient $CO_2$ in the hydrogen-rich gas so that the molecular weight of the hydrogen-rich gas is at least 4; and (d) Centrifugally compressing the hydrogen-rich gas obtained in accordance with step (c) to a pressure between 1,200 and 5,000 p.s.i.g. and at least 300 p.s.i. above the pressure obtained in accordance with step (b).

Preferably the amount of $CO_2$ left in the hydrogen-rich gas after removal of $CO_2$ from the hydrogen-rich gas at the first pressure level is sufficient so that the molecular weight of the hydrogen-rich gas is at least 4. Still more preferably, sufficient $CO_2$ is left so that the molecular weight of the gas mixture is at least 6.

Similar to this mode of operation is the disclosure in our parent application, Ser. No. 736,520, at pages 16 and 17 wherein the concept of partial $CO_2$ removal prior to centrifugal compression is discussed.

In most instances it is desired that the hydrogen feed gas to hydroconversion processes, such as hydrodesulfurization and hydrodenitrification, contain no more than a slight amount of carbon oxides. Thus, for the hydrogen-rich gas streams produced according to the process of the present invention at a first and second pressure level, there is generally employed separate methanation steps to convert residual carbon oxides to methane. Alternatively, a final $CO_2$ (and in some instances CO also) removal step is employed.

In those modes of operation wherein sufficient $CO_2$ is left in the hydrogen-rich gas to the first pressure level so that it is feasible to centrifugally compress the hydrogen-rich gas to the second pressure level, it is usually desirable to employ an additional final $CO_2$ removal step at the first pressure level, such as physical absorption and/or amine scrubbing, to remove $CO_2$ from *that portion* of the hydrogen-rich gas which is to be used in the hydroconversion unit operating at the first pressure level.

BRIEF DESCRIPTION OF THE DRAWING

The drawing is a schematic flow diagram of a preferred embodiment of the invented process for producing high pressure hydrogen at two pressure levels.

DETAILED DESCRIPTION

Referring now in more detail to the embodiment of the invention shown in the drawing, light hydrocarbon in line 1 is combined with low pressure steam in line 2 and introduced to reforming furnace 3 for reaction to produce a hydrogen gas. Typically the light hydrocarbon is natural gas comprised mostly of methane. The natural gas is desulfurized using activated carbon to adsorb sulfur compounds. If excessive sulfur compounds remain in the feed, the nickel catalyst which is typically used to speed up the kinetics of the reaction of methane with $H_2O$ is poisoned.

Generally the reforming reaction in furnace 3 takes place at a pressure of about 300 p.s.i.g. and a temperature of about 1500° F. Thus there is substantial heat present in the hydrogen-rich gas containing $CO_2$ and CO withdrawn from reforming furnace 3 via line 4. This heat is removed by boiler feed water (BFW) introduced via line 6 to boiler 5. Steam is withdrawn from the boiler via line 7. The cooled gases are withdrawn from the boiler via line 8. Usually the gases are withdrawn from boiler 5, or other heat exchange means such as direct water quench, at a temperature of about 700° F.

The gas stream in line 8 contains several percent carbon monoxide which is desirably shifted with steam to produce hydrogen and $CO_2$. The shift conversion is accomplished in shift conversion zone 9. Preferably shift conversion zone 9 is comprised of a high temperature shift conversion step operating at about 650 to 800° F., followed by a low temperature CO shift conversion step operated at about 350 to 500° F. The high temperature shift conversion step employs an iron-chrome catalyst and the low temperature shift conversion stage employs a copper-zinc oxide catalyst.

The hydrogen gas stream, now enriched in hydrogen because of the CO shift conversion, is withdrawn from shift conversion zone 9 via line 10 at about 350 to 500° F. Heat is removed from this hydrogen gas stream by boiler feed water introduced via line 12 to boiler 11. Steam which is produced is withdrawn via line 13. The steam which is produced in boiler 11 is usually about 40 p.s.i.g. steam whereas the steam produced in boiler 5 and withdrawn in line 7 is substantially higher pressure steam. The cool hydrogen gas stream is withdrawn from boiler 11 via line 14 and introduced to separator 15. Condensate which results from cooling the hydrogen gas stream is withdrawn via line 16 from the bottom of separator 15. Typically the hydrogen gas stream entering separator 15 is at a temperature of about 90° F. before cooling subsequent to boiler 11 by exchange with cooling water or by heat exchange with air in a thin fan cooler.

The hydrogen gas which has been substantially freed of water but which still contains the $CO_2$ resulting from reforming in furnace 3 and shift conversion in zone 9 is introduced via line 17 to centifugal compressor 18.

As indicated previously the advantages and many of the other factors pertinent to centrifugal compression prior to complete $CO_2$ removal are disclosed in our application Ser. No. 736,520 which application is incorporated by reference into the present application. Because of the $CO_2$ present in the hydrogen gas feed to centrifugal compressor 18, molecular weight of the hydrogen gas is sufficient so that centrifugal compression is feasible to obtain high pressure hydrogen, for example 900 p.s.i.g and above. As explained in our earlier application Ser. No. 736,520 if essentially all of the $CO_2$ is removed prior to compression then the molecular weight of the gas is too low to make use of centrifugal compressors feasible. Thus reciprocating compressors would be required. Reciprocating compressors, in turn, are not as dependable and in many respects are more expensive than centrifugal compressors. Also, reciprocating compressors are not amenable to drive by means of a steam turbine driver.

Turbine driver 19 is driven by high pressure steam introduced via line 20. The high pressure steam is obtained from boiler feed water which is introduced to reforming furnace 3 via line 21. The boiler feed water is heated in the convection section of the reforming furnace to generate the high pressure steam. Steam to drive turbine 19 may also be advantageously obtained by further heating in reforming furnace 3 the steam produced in boilers 5 or 11.

The high pressure steam is substantially higher pressure than the low pressure steam exhausting from turbine driver 19 via line 21. Thus the terms high and low pressure are relative and are best defined as steam pressure levels having sufficient pressure differential to furnish practical motive power for a turbine driver such as turbine driver 19 but yet with the low pressure exhaust steam being of sufficient pressure to enter a steam hydrocarbon reforming furnace as process steam. Example pressures would be 500 to 1,500 p.s.i.g. high pressure steam, preferably about 900 p.s.i.g., and 150 to 300 p.s.i.g. low pressure steam exhausting from the turbine in line 2.

As indicated earlier, the low pressure steam exhausting from the turbine is combined with natural gas in line 1 and is fed to reforming furnace 3. Thus the steam generated from the heat in the convection section of reforming furnace 3 is utilized twice in an integrated fashion in the present process for high pressure hydrogen manufacture. The steam is utilized first at its higher pressure in order to drive turbine driver 19 which, in turn, drives centrifugal compressor 18. The low pressure exhaust steam from the turbine is then utilized as process steam which reacts with the light hydrocarbon in reforming furnace 3 to produce a gas stream comprising hydrogen withdrawn in line 4.

A mixture of high pressure hydrogen and $CO_2$ is removed from centrifugal compressor 18 via line 22. $CO_2$ is removed from the $CO_2$-hydrogen gas mixture in $CO_2$ removal zone 23. Preferably the $CO_2$ is removed by absorption of $CO_2$ into a physical absorbent. By physical absorbent is meant an absorbent which may be freed of at least a majority (more than 50% of the $CO_2$) which would be absorbed in the absorption step, by means of reducing the pressure from the absorption pressure down to a substantially lower pressure as, for example, down to a pressure between about atmospheric pressure and 100 p.s.i.g. As discussed in our Ser. No. 736,520 it is surprisingly advantageous to utilize high pressure $CO_2$ removal, particularly using a physical absorbent in conjunction with centrifugal compression of the hydrogen-$CO_2$ gas mixture.

Product hydrogen is withdrawn from $CO_2$ removal zone 23 via line 24. As indicated above under "Summary of the Invention" only a certain portion of the $CO_2$ is removed in $CO_2$ removal zone 23 in those embodiments of the present invention wherein sufficient $CO_2$ is left in the hydrogen-rich gas so that the hydrogen-rich gas fed to centrifugal compressor 33 via line 31 has a sufficient $CO_2$ content to make centrifugal compression to the second pressure level feasible. However for the embodiment of the present invention illustrated in the drawing, the invention is described by referring to that mode of operation wherein $CO_2$ removal in zone 23 is substantially complete and the molecular weight of the hydrogen-rich gas is adjusted for compression to the second pressure level by the injection of a light hydrocarbon via line 30.

In that mode of operation wherein the molecular weight of the high pressure hydrogen is adjusted by hydrocarbon injection, the first level high pressure hydrogen withdrawn via line 25 will usually be passed to a methanation zone prior to introduction to hydroconversion unit 26. Hydroconversion unit 26 operates according to well-known principles for some type of hydroprocessing (for example, hydrodesulfurization) at a pressure between 900 and 2,000 p.s.i.g. Product hydrocarbons, for example, of substantially reduced sulfur content, are withdrawn from hydroconversion unit 26 via line 27.

Light hydrocarbons (methane to butanes) may be withdrawn from hydroconversion unit 26 distillation section via line 28 and passed via line 30 to the hydrogen-rich gas feed to centrifugal compressor 33. However, as explained above under "Summary of the Invention," it is preferred to obtain a stream of light hydrocarbons from the distillation section of the second pressure level hydroconversion unit because these hydrocarbons will need little, if any, compression in order to be injected into the hydrogen-rich gas stream at the first pressure level immediately prior to centrifugal compression to the second pressure level. Usually a stream of light hydrocarbons is not available from the first pressure level hydroconversion unit for injection into the hydrogen-rich gas in line 31 without substantial compression of such light hydrocarbons.

For an operating pressure of about 1,500 p.s.i.g. in hydroconversion unit 26 the hydrogen-rich gas at the first pressure level will enter centrifugal compressor 33 at a pressure of about 1,500 p.s.i.g. At this pressure level it is preferable to inject about 7 volume percent butane or an equivalent amount (in terms of average molecular weight attained for the hydrogen-rich gas) of a mixture of light hydrocarbons into the hydrogen-rich gas which is fed via line 31 to centrifugal compressor 33. This will raise the molecular weight of the hydrogen-rich gas to at least about 6.

The hydrogen-rich gas is compressed from about 1,500 p.s.i.g. to a pressure of about 4,000 p.s.i.g. by centrifugal compressor 33. The high pressure hydrogen-rich gas at the second pressure level is withdrawn from centrifugal compressor 33 via line 35. In accordance with the presently described mode of operation the hydrogen-rich gas is bypassed via line 35a around $CO_2$ removal zone 36. Because the molecular weight is adjusted primarily by hydrocarbon injection in the presently described mode of operation, there is not a large amount of $CO_2$ remaining in the hydrogen-rich gas so as to require the use of $CO_2$ removal zone 36.

$CO_2$ removal zone 36 typically employs a physical absorbent to remove $CO_2$ left in the hydrogen-rich gas in those modes of operation wherein a certain amount of $CO_2$ is purposefully left in the hydrogen-rich gas fed to centrifugal compressor 33.

In both those cases where $CO_2$ removal zone 36 is used to remove $CO_2$ from the second pressure level hydrogen-rich gas and those gases wherein the second pressure level hydrogen-rich gas is bypassed via line 35a around $CO_2$ removal zone 36, there is generally a residual amount of carbon oxides remaining in the high pressure hydrogen-rich gas. The residual carbon oxides are removed by methanation prior to introduction of the hydrogen-rich gas to hydroconversion unit 38.

Hydroconversion unit 38 is operated at a high pressure between 1,200 and 5,000 p.s.i.g. For purposes of example, hydroconversion unit 38 is a hydrodenitrification unit processing a feed containing between 1,000 and 5,000 p.p.m. nitrogen (in the form of organic nitrogen compounds) and is operated at a pressure of 4,000 p.s.i.g. According to principles well known in the art product hydrocarbons substantially reduced in organic nitrogen content are withdrawn via line 39 from hydroconversion unit 38.

As is illustrated in the drawing, high pressure steam which is generated by heating boiler feed water in reforming furnace 3 is used as motive power to drive both turbine driver 19 driving compressor 18 and turbine driver 34 driving compressor 33. The low pressure exhaust steam from the turbines exhausts via lines 2 and 2a. The exhaust steam is combined with light hydrocarbons fed to reforming furnace 3 for reaction to produce a gas stream comprised of hydrogen, $CO_2$ and CO.

Although various specific embodiments of the invention have been described and shown, it is to be understood they are meant to be illustrative only and not limiting. Certain features may be changed without departing from the spirit or essence of the invention. It is apparent that the present invention has broad application to the production of high pressure hydrogen at two pressure levels using centrifugal compressors. Accordingly, the invention is not to be construed as limited to the specific embodiments illustrated but only as defined in the appended claims.

We claim:

1. A process for producing high pressure hydrogen at two pressure levels which comprises:
    (a) generating a hydrogen-rich gas stream containing sufficient $CO_2$ so that the molecular weight of the hydrogen-rich gas is at least 4;
    (b) centrifugally compressing the hydrogen to a pressure between about 900 and 2,000 p.s.i.g. before the molecular weight of the hydrogen-rich gas is reduced below 4 by $CO_2$ removal, to obtain compressed hydrogen-rich gas;
    (c) removing $CO_2$ from the compressed hydrogen-rich gas by physical absorption of $CO_2$ to obtain a $CO_2$-lean, hydrogen-rich gas having a molecular weight less than 4;
    (d) injecting a sufficient amount of light hydrocarbon into the $CO_2$-lean, hydrogen-rich gas subsequent to $CO_2$ removal to raise the molecular weight of the $CO_2$-lean, hydrogen-rich gas from below 4 to at least 4;
    (e) centrifugally compressing the hydrogen-rich gas obtained in step (d) to a pressure between about 1,200 and 5,000 p.s.i.g. and at least about 300 p.s.i. higher than the pressure obtained in accordance with step (b); and
    (f) using the hydrogen-rich gas obtained in accordance with step (c) in a hydroconversion process operating at a pressure between 900 and 2,000 p.s.i.g. and using the hydrogen-rich gas obtained in accordance with step (e) in a hydroconversion process operating at a pressure between about 1,200 and 5,000 p.s.i.g.

2. A process in accordance with claim 1 wherein at least 90 percent of the $CO_2$ in the compressed hydrogen-rich gas is removed from the compressed hydrogen-rich gas prior to step (d).

3. A process according to claim 2 wherein after injection of a light hydrocarbon into the $CO_2$-lean, hydrogen-rich gas, the hydrogen-rich gas containing the added light hydrocarbon is centrifugally compressed to a pressure between 2,000 and 4,000 p.s.i.g. and at least 300 p.s.i. greater than the pressure obtained according to step (b).

4. A process according to claim 2 wherein sufficient light hydrocarbon is injected to raise the molecular weight of the $CO_2$-lean, hydrogen-rich gas to at least six.

5. A process according to claim 4 wherein the light hydrocarbon is primarily butane.

6. A process according to claim 1 wherein the hydrogen-rich gas containing $CO_2$ is generated by steam-hydrocarbon reforming.

7. A process for producing high-pressure hydrogen at two pressure levels which comprises:
(a) generating a hydrogen-rich gas stream containing sufficient $CO_2$ so that the molecular weight of the hydrogen-rich gas is at least 4;
(b) centrifugally compressing the hydrogen to a pressure between about 900 and 2,000 p.s.i.g. before the molecular weight of the hydrogen-rich gas is reduced below 4 by $CO_2$ removal, to obtain compressed hydrogen-rich gas;
(c) removing $CO_2$ from the compressed hydrogen-rich gas but leaving sufficient $CO_2$ in a portion of the hydrogen-rich gas so that the molecular weight of said portion of the hydrogen-rich gas is at least 4;
(d) centrifugally compressing said portion of the hydrogen-rich gas obtained in accordance with step (c) to a pressure between 1,200 and 5,000 p.s.i.g. and at least 300 p.s.i. above the pressure obtained in accordance with step (b); and
(e) using the hydrogen-rich gas obtained in accordance with step (c) in a hydroconversion process operating at a pressure between 900 and 2,000 p.s.i.g. and using the hydrogen-rich gas obtained in accordance with step (d) in a hydroconversion process operating at a pressure between about 1,200 and 5,000 p.s.i.g.

8. A process in accordance with claim 7 wherein the amount of $CO_2$ left in the hydrogen-rich gas after step (c) is sufficient so that the molecular weight of the hydrogen-rich gas is at least 6.

References Cited

UNITED STATES PATENTS

| 2,632,689 | 3/1953 | Latchum, Jr. | 23—153 |
| 3,401,111 | 9/1968 | Jackson | 208—108 |
| 3,418,082 | 12/1968 | Ter Haar | 23—213 |
| 3,420,633 | 1/1969 | Lee | 23—210 |

EDWARD STERN, Primary Examiner

U.S. Cl. X.R.

23—210, 213; 208—108